Figure 1:
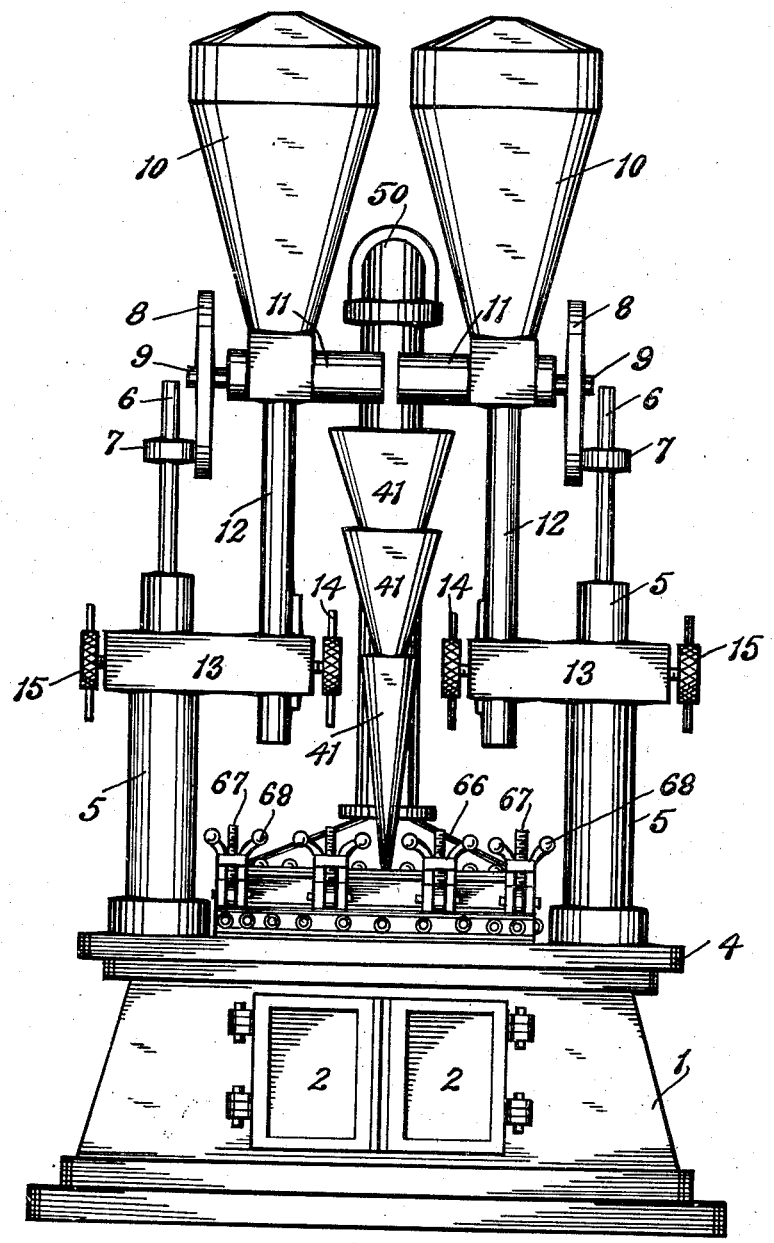

March 12, 1940.    SAMU-EL ISH-SHALOM    2,193,003
DUPLEX MIXING APPARATUS
Filed Aug. 2, 1939    6 Sheets-Sheet 1

INVENTOR.
SAMU-EL ISH-SHALOM
BY Harry Radzinsky
ATTORNEY.

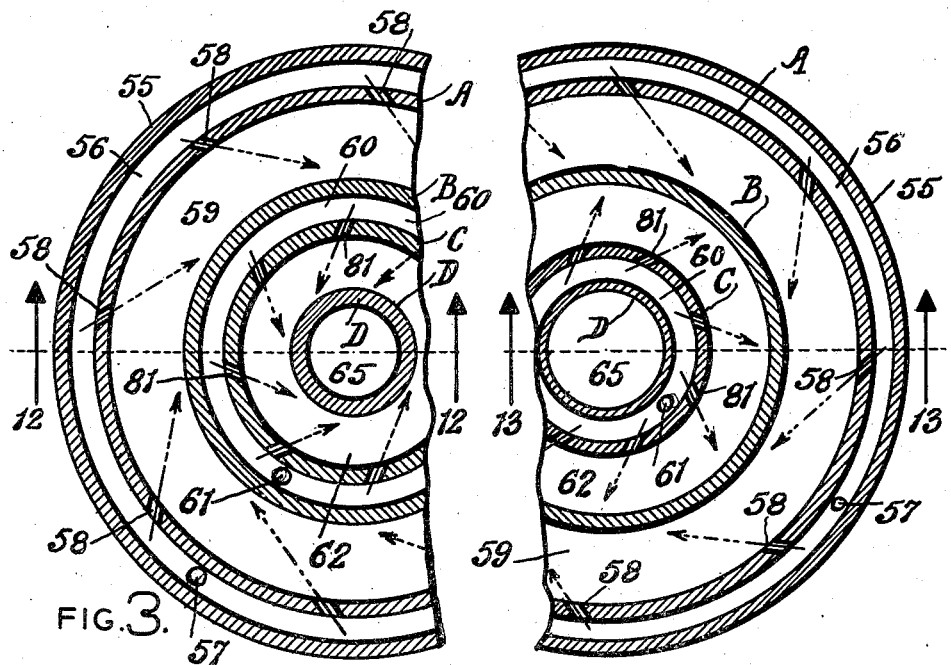
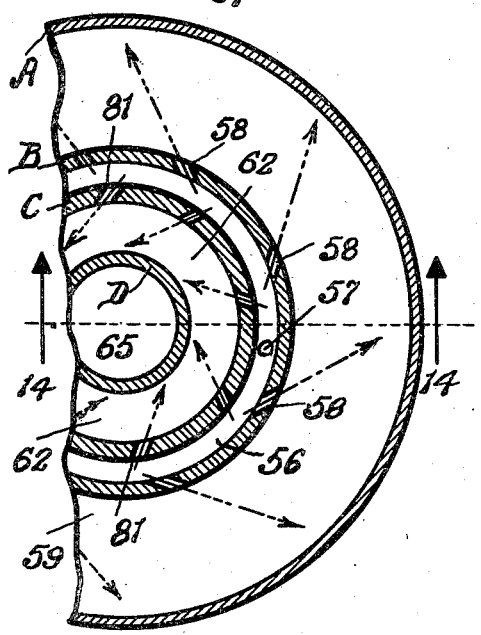
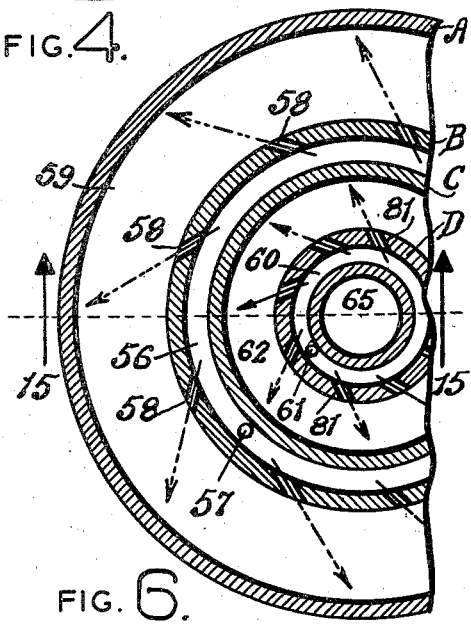
INVENTOR.
SAMU-EL ISH-SHALOM
BY Harry Radzinsky
ATTORNEY.

March 12, 1940.  SAMU-EL ISH-SHALOM  2,193,003
DUPLEX MIXING APPARATUS
Filed Aug. 2, 1939   6 Sheets-Sheet 4

INVENTOR.
SAMU-EL ISH-SHALOM
BY
ATTORNEY.

March 12, 1940.　　　SAMU-EL ISH-SHALOM　　　2,193,003
DUPLEX MIXING APPARATUS
Filed Aug. 2, 1939　　　6 Sheets-Sheet 5

INVENTOR.
SAMU-EL ISH-SHALOM
BY
Harry Radzinsky
ATTORNEY.

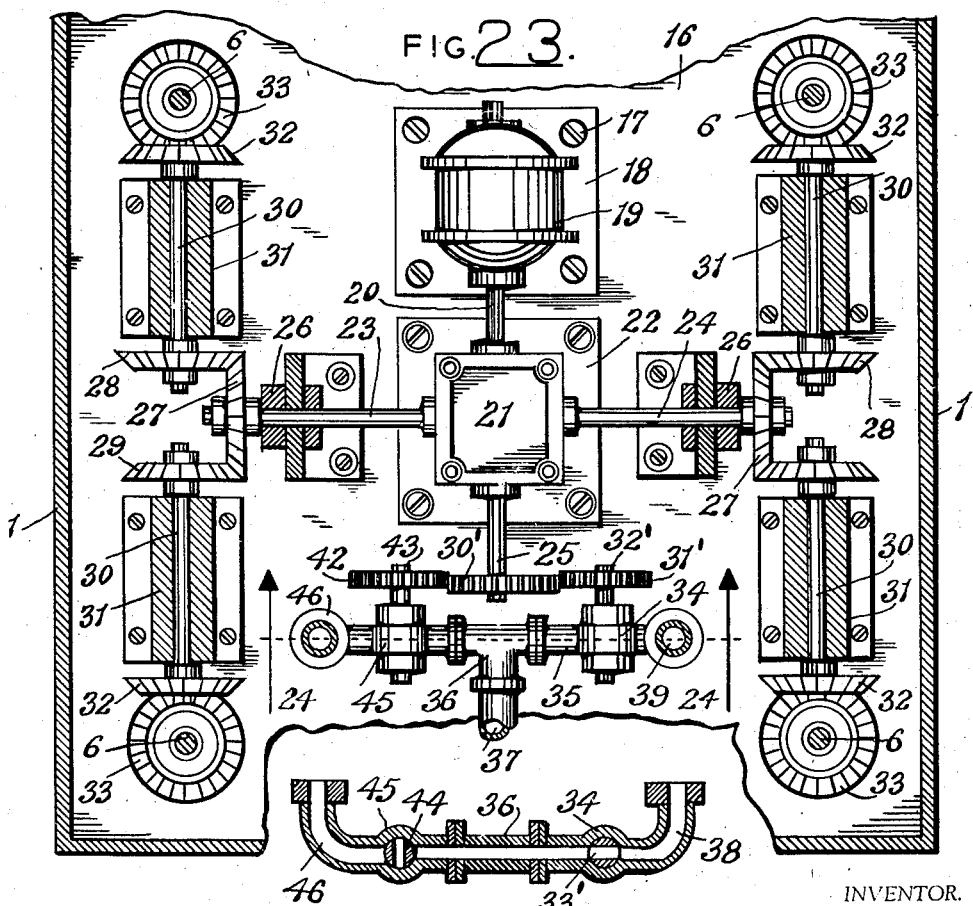

Patented Mar. 12, 1940

2,193,003

UNITED STATES PATENT OFFICE 2,193,003

DUPLEX MIXING APPARATUS

Samu-El Ish-Shalom, Brooklyn, N. Y.

Application August 2, 1939, Serial No. 287,890

8 Claims. (Cl. 259—4)

This invention relates to sterilizers and mixers which are provided with a mixing chamber wherein a plurality of powdered materials such as are, for example, employed in the manufacture of cosmetics, are delivered into a stream of air revolving at a great speed and under great compressional energy.

It is one of the objects of this invention to provide a new and improved method and means of mixing materials in a device having a mixing chamber of the character described, and it is intended to provide a mixing chamber in such a device with a duplex air-supply arrangement, whereby the number of air inlet openings may be increased or decreased according to requirements and arranged in different rows or assemblages to forward the powdered materials in the mixing chamber in the same or different directions and in a more efficient manner.

It is also one of the objects of this invention to provide an arrangement whereby a plurality of different powdered materials are introduced into a primary mixing chamber, from whence they are transferred into an auxiliary mixing chamber, where they are intermixed with the powdered materials in said auxiliary mixing chamber, and after a predetermined time has elapsed are transported to a separator and collector.

It is also an object of this invention to provide an arrangement which includes a plurality of mixing chambers; which also includes means to deliver different powdered materials to one of said mixing chambers while other powdered materials are delivered into an auxiliary mixing chamber; which includes means for transporting the different materials from one chamber into the other and means for delivering the mixed material from both mixing chambers to a separator and collector.

It is also an object of this invention to provide an arrangement in an improved mixing and sterilizing device wherein concentrically arranged mixing chambers are of different diameter and wherein the circumference of the outer mixing chamber if greater than the circumference of the inner mixing chamber.

It is a further object of this invention to provide an improved arrangement in a device of this character in which means for operating continuously and intermixing different powdered materials is employed and wherein a primary mixing chamber is located around an auxiliary mixing chamber, and is utilized to produce a double-mixing action wherein solid powdered materials are put into suspension and thorough and rapid mixing is accomplished.

It is also an object of this invention to provide an arrangement wherein a plurality of powdered materials may be introduced in an outer mixing chamber at the same time and subjected first to a primary mixation and driven by centrifugal force to the inner mixing chamber where additional materials may be added before the mixed materials reach the material collector.

It is also an object of this invention to provide a method whereby finely divided powdered materials may be mixed under sterile conditions and wherein the proportions of colored materials may be duplicated over and over again in a manner which has heretofore been impossible with existing methods and equipment. Often when wishing to duplicate a shade with present-day equipment, it is impossible because there are no means to measure or record the proportions accurately.

Still another object of this invention is to provide a simple, compact and highly efficient mixer, the capacity of which may be conveniently altered and regulated to produce the desired output of a mixture of pre-selected materials. Unless powder is thoroughly mixed after various colors or coloring materials are added to the base, the resultant produce is not satisfactory because there may be particles of color left unblended or streaked. With this new method of mixing in the case of powdered cosmetics, the coloring and base materials are perfectly blended and therefore the finding of odd grains of different colored streaks on the face is unlikely.

It is a further object of this invention that the improved apparatus be of simple construction and easy to clean and therefore maintained in sanitary condition, and wherein the various parts are conveniently adjustable to produce more efficient operation and are readily accessible for inspection, cleaning and adjustment.

It is a further object of this invention to provide an apparatus for carrying out the above processes which will be capable of operating continuously at a high rate of output and wherein all parts of the apparatus which are to come in contact with the different materials may be composed of a non-corroding and non-oxidizing material, and which may be manufactured and sold at a relatively minimum cost and which may also be assembled in units of variable capacities to suit different requirements and it may be operated with a minimum of power consumption.

Figure 2:
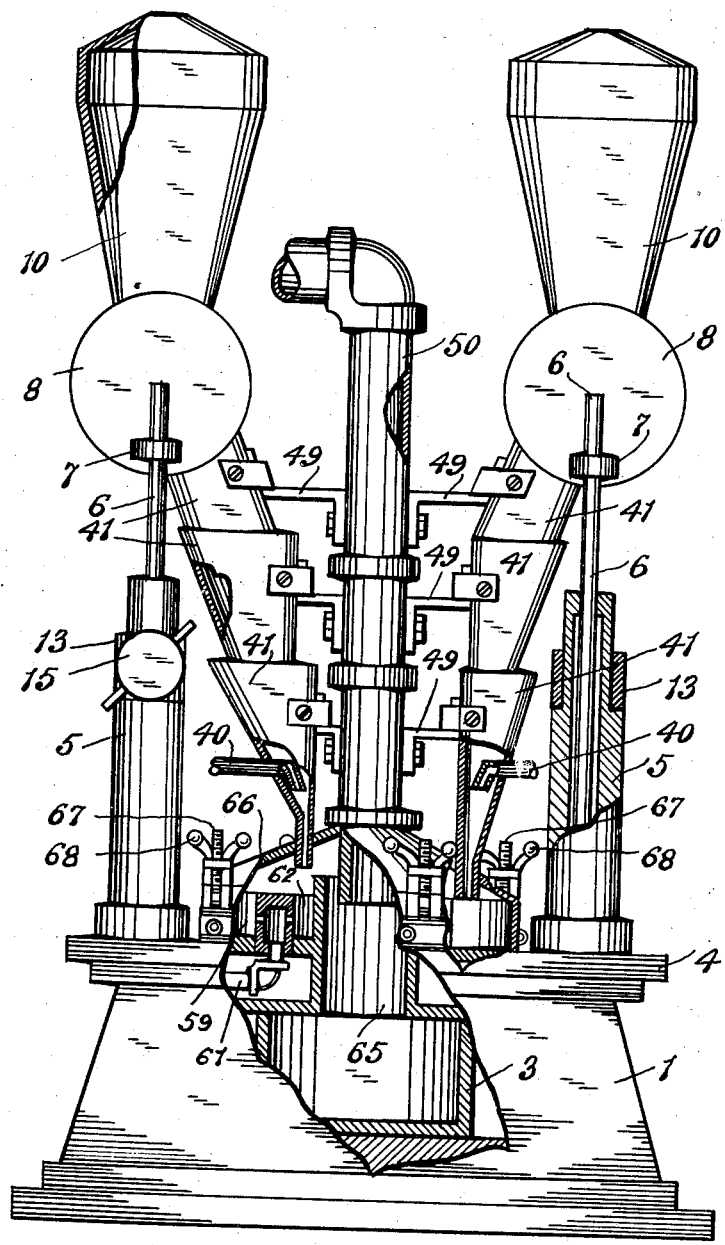
Figure 7:
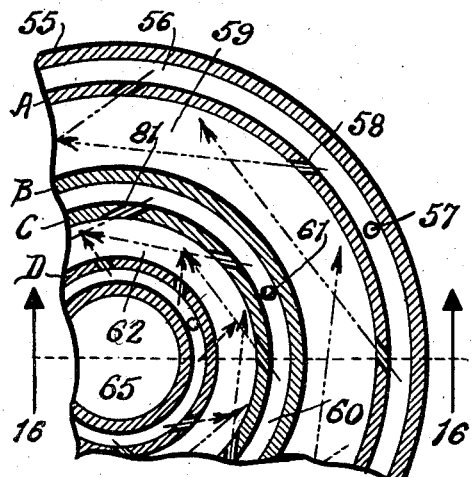
Figure 8:
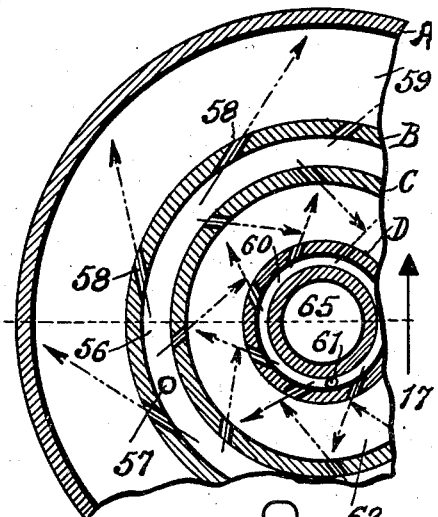
Figure 9:
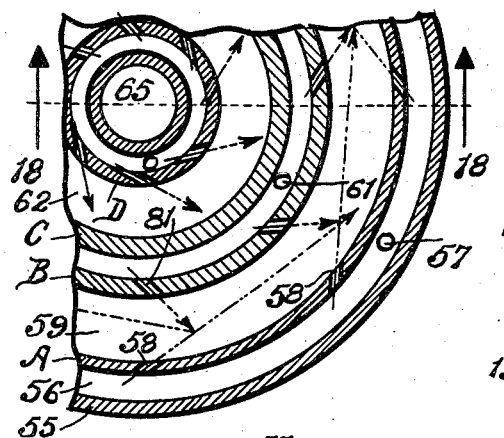
Figure 10:
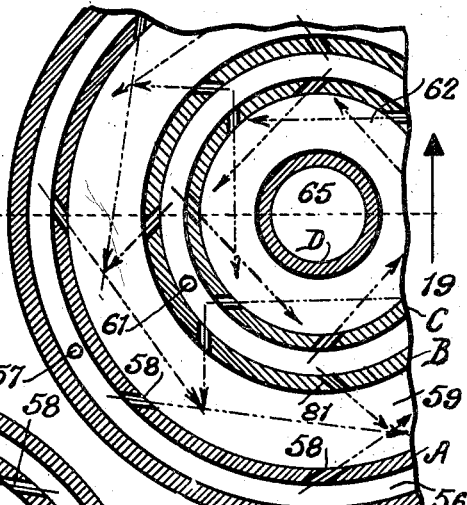
Figure 11:
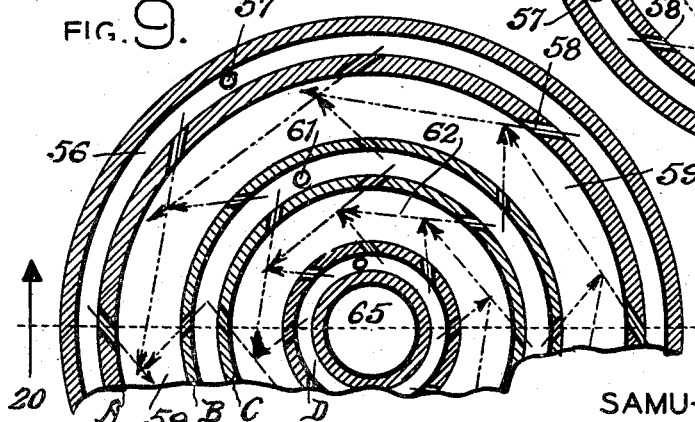
Figure 12:
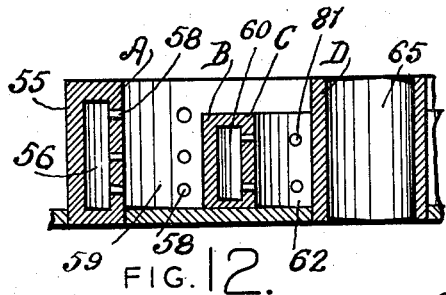
Figure 13:
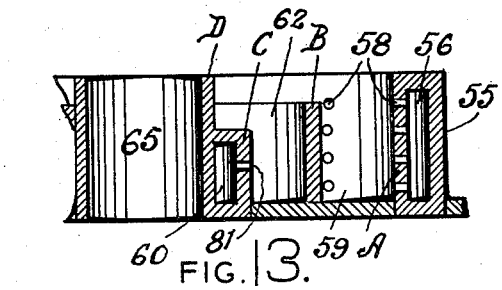
Figure 14:
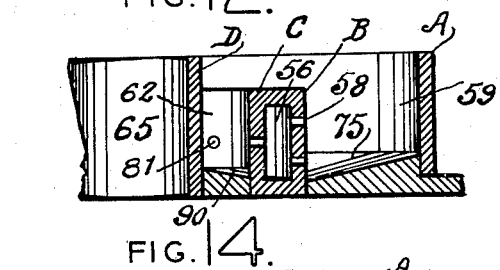
Figure 15:
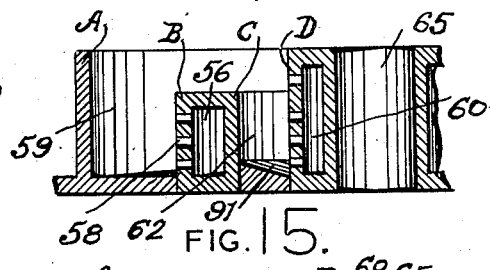
Figure 16:
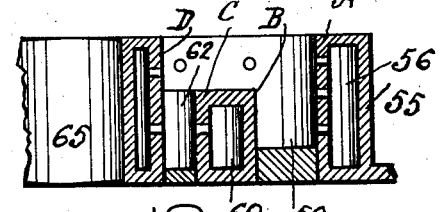
Figure 17:
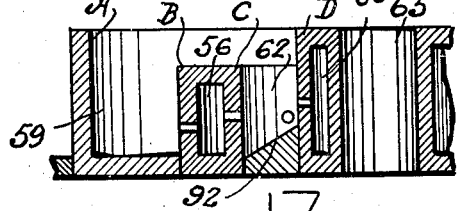
Figure 18:
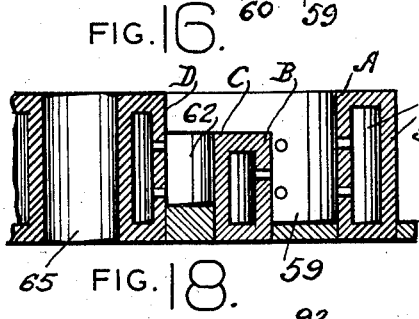
Figure 19:
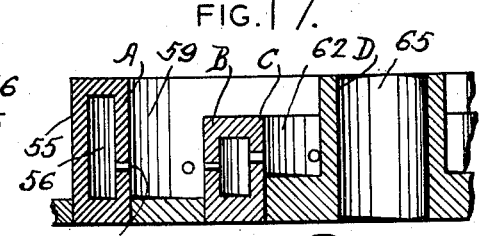
Figure 20:
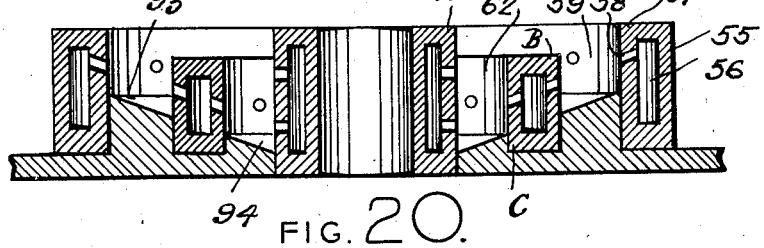

In the accompanying drawings, wherein several embodiments of the invention are shown, Fig. 1 is a front elevation of a machine constructed in accordance with the invention; Fig. 2 is a side elevation of the same, with parts in section and other parts broken away to disclose construction; Figs. 3 to 11 inclusive are horizontal sectional views through various forms of mixing chambers, showing the numerous ways in which air under pressure may be admitted to and circulated within the chambers according to various mixing requirements; Fig. 12 is a sectional view on the line 12—12 of Fig. 3, looking in the direction of the arrows; Fig. 13 is a sectional view on the line 13—13 of Fig. 4, looking in the direction of the arrows; Fig. 14 is a sectional view on the line 14—14 of Fig. 5, looking in the direction of the arrows; Fig. 15 is a sectional view on the line 15—15 of Fig. 6, looking in the direction of the arrows; Fig. 16 is a sectional view on the line 16—16 of Fig. 7, looking in the direction of the arrows; Fig. 17 is a sectional view on the line 17—17 of Fig. 8, looking in the direction of the arrows; Fig. 18 is a sectional view on the line 18—18 of Fig. 9, looking in the direction of the arrows; Fig. 19 is a sectional view on the line 19—19 of Fig. 10, looking in the direction of the arrows; Fig. 20 is a sectional view on the line 20—20 of Fig. 11, looking in the direction of the arrows; Fig. 21 is a chart indicating the location of the air-admission openings with respect to the mixing chambers into which they lead. Fig. 22 is a chart indicating the suggested number of air-admission openings according to the structures disclosed in Figs. 12 to 20 inclusive; Fig. 23 is a plan view, with parts in section, of the driving means for the feeding mechanism; and Fig. 24 is a sectional view on the line 24—24 of Fig. 23, looking in the direction of the arrows.

With reference to Figs. 1 and 2, 1 indicates a hollow supporting base within which the driving mechanism for the feeding means is located. Said base is provided, in one or more of its sides, with the hinged doors 2 by means of which access to the interior of the base is attained and through which the material-collection receptacle 3 may be placed in position or removed for emptying after having been filled.

Secured on top of the base 1 is plate 4 from which four tubular uprights 5 arise, each of said uprights acting as a bearing for a vertical shaft 6, provided near its upper end with a friction roller 7 that frictionally engages the face of a larger roller 8 secured on a shaft 9. Shaft 9 is part of a feed means by which the material contained in each of the four hoppers indicated at 10 is delivered out of the hopper through a feed tube 11. The feed mechanism above referred to, is shown in detail in my co-pending application, Serial No. 280,785, filed June 23, 1939 and will therefore not be herein described in detail. It is sufficient to state that when shaft 9 of each hopper is rotated, the material in the hopper will be fed out of the feed tube 11.

Extending downwardly from each hopper 10 is a vertical rod 12, adjustable vertically through an arm 13 that is adjustable rotatively on the tubular upright 5. Set screw 14 holds the rod 12 in any selected position of adjustment. A similar set screw 15 passing through arm 13 holds the same against rotative movement. By manipulation of the set screw 14 the hopper can be raised or lowered and the speed of feed of the material in the hopper is thereby either increased or decreased since vertical adjustment of each hopper locates drive roller 7 closer to or farther away from the axis of friction roller 8 according to the direction of movement of the hopper. Loosening of set screw 15 permits the arm 13 and hopper 10 carried thereby to be swung as a unit to one side of the machine, rendering it easily accessible for filling, cleaning or the like.

The manner in which the four vertical shafts 6 are driven is shown in detail in Fig. 23. Secured by the screws 17 on the base plate 16 of base member 1 is a motor mounting plate 18 on which an electric motor 19 is mounted. Shaft 20 of the motor drives reduction gearing 21 mounted on plate 22, and which drives the three shafts 23, 24 and 25. Shaft 23 is supported at one end in the bearing 26 and carries a beveled gear 27 which meshes with and drives the two similar beveled gears 28 and 29. Gear 28 is secured on shaft 30 rotatively mounted in the bearing 31 and carrying a beveled gear 32 on its opposite end. Beveled gear 32 meshes with and drives a similar beveled gear 33 secured on the lower end of one of the vertical shafts 6. In similar manner all of the vertical shafts 6 are rotated, the shaft 23 driving two of said vertical shafts, while shaft 24 drives the remaining two.

Secured on the shaft 25 is a gear 30' which drives a gear 31' secured on stud 32' extending from the rotary valve 33' rotatively mounted in the housing 34 in air-feed pipe 35 joined to the T-connection 36, a branch of which is attached to pipe 37 that extends to a source of compressed air such as a tank or pump or the like. Extending from valve housing 34 is an elbow 38 which connects through suitable piping to tubing 39 to one of two nozzles 40, each of which is located in the lowermost of a series of funnel-shaped delivery tubes 41, each of said delivery tubes receiving material from two of the hoppers by gravity and allowing it to fall down into the lowermost tube 41 from whence it is blown by air pressure emanating from the nozzle 40 into one of the mixing chambers to be hereinafter described. In other words, the valve 33' controls the flow of compressed air to one of the nozzles 40 whereby the feed of material from two of the hoppers is simultaneously controlled.

Gear 30' on shaft 25 also meshes with and drives a gear 42 secured on stud 43 extending from rotary valve 44 in the housing 45 connected to a branch of the T-connection 36 and having an elbow 46 which connects through piping or tubing to the second nozzle 40 located in the second of the funnel-shaped feed tubes 41 leading from two of the hoppers. Thus, while valve 33' controls the feed of materials from two of the hoppers, the valve 44 controls the feed from the remaining two hoppers. It will be seen that the valves 33' and 44 are so arranged that while one of the valves is opened the other valve is closed so that a flow of compressed air through one of the nozzles 40 occurs while the flow of air to the second nozzle is shut off. Thus, the material from two of the hoppers is being fed into one of the mixing chambers while the supply of material from the remaining two hoppers is shut off.

Each pair of hoppers 10 has its outlet tubes 11 directed into one of the sets of funnel-shaped feed tubes 41, each of the three elements of the feed tubes being removably supported upon an angle bracket 49 secured to the air exhaust pipe 50. Secured to, or forming a part of the top plate 4 of the base is a receptacle in which the mixing chambers are formed, several arrangements thereof being shown in Figs. 3 to 20.

With reference to the mixing chamber disclosed in Fig. 3, 55 indicates the outer vertical wall of an annular air chamber 56 through which compressed air is forced, the air being delivered thereinto by means of one or more supply pipes which lead through the bottom of the chamber 56 and communicate therewith, as indicated at 57 in Fig. 3. An inner wall A of chamber 56 is provided with a plurality of spaced angularly extending openings or holes 58 through which compressed air is forced from chamber 56 as indicated in dotted arrow-headed lines in Fig. 3. The air so forced enters the main mixing chamber 59 into which the materials from two of the hoppers is fed by one of the nozzles 40 and the air streams entering chamber 59 in the manner described swirl the materials about in said chamber and effectively mix the same.

The concentric lower inner wall B of chamber 59 is imperforate and it constitutes the outer wall of a closed-top air chamber 60 into which a flow of compressed air is directed by means of suitable piping or tubing 61 leading from a source of air under pressure. Air chamber 60 includes a vertical annular inner wall C formed with a plurality of angularly arranged apertures or holes 81 through which the compressed air may flow from the interior of chamber 60, as indicated in dotted arrow-headed lines to the interior of mixing chamber 62 into which materials are fed from the remaining two hoppers. The inner wall D of mixing chamber 62 consists of a cylinder forming a passage 65 (Fig. 2) through which the various mixed materials will descend into the collection receptacle 3, while the flow of air will be exhausted upwardly through the exhaust stack 50, the lower end of which is disposed within passage 65, as clearly shown in Fig. 2. The top of the mixing chamber receptacle is closed by means of the cover 66, removably secured in place by means of the bolts 67 engaged by the wing nuts 68.

I have found that various desirable results in mixing different kinds of materials can be secured by differences in direction of air flow; by various arrangements of the two mixing chambers; by vertical and angular arrangements of the surfaces against which the air under pressure and the materials transported thereby will impinge. In Figs. 3 to 20 several arrangements are disclosed. In each instance the inner or auxiliary mixing chamber is designated at 62 and the outer or main mixing chamber at 59. In each of said embodiments is also provided an outer air supply chamber 56 corresponding to that shown in Fig. 3, but in some cases differently located. In each case also, the inner air supply chamber is indicated at 60, the position thereof varying according to the desired direction of air flow from said air supply chamber into the mixing chamber into which the flow is directed. By the various arrangements, disclosed in Figs. 3 to 11 inclusive, the direction of flow of the air under pressure is attained. For example, in the structure shown in Fig. 3, the air from chamber 56 is directed inwardly with a swirling motion into mixing chamber 59 while the air from the inner chamber 60 is also directed inwardly or toward the center of the mixing chamber receptacle and into the inner mixing chamber 62. In other words, in this construction the flow of air from chambers 56 and 60 is in the same direction or inwardly with a swirling motion towards the center of the mixing chamber casing. In Fig. 4, the air is directed outwardly from air chamber 60 while the flow from air chamber 56 is directed in an opposite direction or inwardly. In Fig. 5 the air from chamber 56 is directed inwardly while some of the air from the same chamber is also directed outwardly into the outer or main mixing chamber 59. In the structure of Fig. 6, the air flow from chambers 56 and 60 is in the same direction or outwardly and away from the center of the mixing casing.

In Figs. 7 to 11, the direction of air flow from the several air supply chambers into the mixing chambers is clearly indicated by the arrows and it will be therein seen that through the several different arrangements proposed, a very complete admixture of the powdered materials directed into the mixing chambers by air under pressure and moved with a swirling motion therein by the air which transports it, is had. A reference to the chart shown in Fig. 21 will indicate the concentric walls in the mixing chamber casing which are provided with the angular air ports through which air is directed with a swirling motion. For example, in Fig. 3 the wall A is provided with the ports 58, this being indicated by a dot under A in the chart. The wall B is imperforate, this being indicated by a circle under B in the chart. The wall C being provided with the angular ports, this being indicated by the dot under C in the chart. The wall D being imperforate, this is indicated by the circle under D in the chart. By reference therefore, to the chart of Fig. 21, the location of the angular ports in the various walls of the different embodiments of the mixing chambers may be at once ascertained.

In Figs. 12 to 20 a suggestion is made as to the relative heights of the walls of the mixing chambers and those of the air supply chambers in the several embodiments of the invention. I have ascertained that by varying the relative heights of the several walls of the chambers different mixing effects can be obtained. I have also found that in some cases, the use of inclined surfaces, such as shown at 75 and 90 in Fig. 14, at 91 in Fig. 15, at 92 in Fig. 17 and at 93 and 94 in Fig. 20 is of importance. These inclined surfaces constituting the bottom of one or both of the mixing chambers tend to cause the material being swirled about in said chambers to rise or be elevated while being swirled so that the material in one of the chambers will more readily rise and become mixed with that in the other chamber, the material so mixed falling down into the delivery tube 65 and from thence into the collection receptacle 3 while the air separated from the mixed material will ascend through and out of the exhaust stack 50.

In Fig. 22, I have indicated in chart form the arrangement of the angular ports shown in the several embodiments of the invention disclosed in Figs. 12 to 20 inclusive. For example, in the wall A of Fig. 12, each group of ports consists of three arranged one above the other, the groups being located at suitably spaced intervals. In the same embodiment of the invention the wall B has no ports as indicated by the numeral "0" appearing under B in the chart. The wall C has spaced groups consisting of two ports in each group as indicated by the numeral "2" under C in the chart. The wall D is imperforate as indicated by the numeral "0" appearing under D in the chart. By applying the chart to each of the structures, the location and number of the angular ports in the several walls of the different embodiments of the invention can be at once ascertained. It will be understood however, that the arrangement of these ports as disclosed in the chart of Fig. 22 is purely suggestive and various modifications thereof may be had to suit different constructional requirements.

Briefly, the operation of the improved mixing device is as follows:

Assuming that the four hoppers 10 are filled with the materials to be mixed, motor 19 is set in operation, causing the vertical shafts 6 to be rotated which will cause the hoppers to feed material through feed tubes 11 and into the funnel-shaped feed tubes 41. As valves 33' and 44 are successively opened, first the materials from one pair of hoppers will be fed into one of the mixing chambers and then the materials from the second pair of hoppers will be fed into the second mixing chamber under air blasts directed from the nozzles 40. Air under pressure directed into the several air chambers 56 and 60 will pass therefrom through the angular ports in the side walls of the air chambers and swirl the materials fed to the several mixing chambers causing said materials to be thoroughly intermingled and drop down in mixed condition through delivery tube 65 into collection receptacle 3.

While I have suggested that the improved device is adapted to be used for mixing powders or other similar materials such as are used in connection with cosmetic manufacture, I wish to be understood as in no wise limiting the invention to such particular use as it will be obvious that the same may be employed for a complete admixture of many other materials wholly remote from cosmetic manufacture.

What I claim is:

1. In a machine of the character described, a mixing receptacle provided with at least two concentrically arranged mixing chambers, one of said chambers being disposed within and surrounded by the other feeding means for independently delivering separate materials to be mixed into said chambers, a source of compressed air supply for delivering air under pressure into the mixing chambers, the chambers having walls provided with angular ports to cause the air directed therethrough to swirl within the mixing chambers, said chambers communicating with each other at the top within the mixing receptacle whereby an intermixture of the materials delivered into both chambers is obtained, and means for separating the mixed materials from the air under pressure.

2. In a machine of the character described, a single mixing receptacle provided with at least two concentrically arranged mixing chambers, feeding means for delivering material to be mixed into said chambers, a plurality of air chambers in the mixing receptacle, a source of compressed air supply for delivering air under pressure into the air chambers, the air chambers being provided with apertured walls communicating with the mixing chambers, the mixing chambers having communicating upper ends within the receptacle whereby an intermixture of materials delivered into both chambers is had within the receptacle, means for separating the mixed materials from the air under pressure, and collection means for the mixed materials.

3. In a machine of the character described, a mixing receptacle having a pair of concentrically arranged mixing chambers, annular air chambers arranged adjacent to the mixing chambers, one of said air chambers being provided with angular ports communicating with one of the mixing chambers, the second of said air chambers having angular ports communicating with the second mixing chamber, and means for conveying air under pressure into the air chambers.

4. In a machine of the character described, a mixing receptacle having a pair of concentrically arranged mixing chambers, annular air chambers arranged within said receptacle adjacent to the mixing chambers, said air chambers being respectively provided with angular ports communicating with the mixing chambers whereby air forced through the ports in one of said air chambers will be swirled through one of the mixing chambers in a direction opposite to that of the air swirled through the other mixing chamber as it enters the same through the ports in the second air chamber.

5. In a machine of the character described, a mixing receptacle having a pair of concentrically arranged mixing chambers provided with annular walls, the walls of one of said chambers being of a greater height than those of the other, said chambers communicating at their upper ends, means for feeding materials to be mixed to the respective chambers, and air chambers disposed within the receptacle for causing air supplied under pressure therein to be delivered into the mixing chambers with a swirling movement in the same direction.

6. In a machine of the character described, a mixing receptacle provided with at least two mixing chambers, one of which is disposed within and surrounded by the other, an air distributing chamber located between the mixing chambers, said air distributing chamber having ports leading into at least one of the mixing chambers for directing air thereinto with a swirling action, a second air distributing chamber having ports leading into the second mixing chamber, means for supplying air under pressure into both of the air distributing chambers, means for feeding materials to be mixed to the mixing chambers, and means for separating the mixed materials from the air under pressure.

7. In a machine of the character described, a mixing receptacle provided with at least two concentrically disposed mixing chambers, one of which is disposed within and surrounded by the other, an air distributing chamber located between the mixing chambers, said air chamber having angularly disposed ports leading into at least one of the chambers for directing air thereinto with a swirling action, a second air distributing chamber having ports leading into the second mixing chamber, an inclined bottom on at least one of the mixing chambers, means for supplying air under pressure into both of the air distributing chambers, means for feeding materials to be mixed to the mixing chambers, and means for separating the mixed materials from the air under pressure.

8. In a machine of the character described, a receptacle having inner and outer mixing chambers, means for causing air under pressure to be swirled within said chambers, means for feeding materials to be mixed to one of said mixing chambers, means for feeding other materials to be mixed to the second chamber, and means for controlling the alternate operation of said several feeding means whereby some of the materials will be fed to one chamber and then the other materials will thereafter be fed to the second chamber, and means for separating the mixed materials from the air under pressure.

SAMU-EL ISH-SHALOM.